United States Patent
Budhia et al.

(10) Patent No.: US 11,895,015 B1
(45) Date of Patent: Feb. 6, 2024

(54) OPTIMIZED PATH SELECTION FOR MULTI-PATH GROUPS

(71) Applicant: Marvell Asia Pte Ltd, Singapore (SG)

(72) Inventors: Rupa Budhia, San Jose, CA (US); William Brad Matthews, Los Gatos, CA (US); Puneet Agarwal, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/090,288

(22) Filed: Oct. 28, 2022

(51) Int. Cl.
| | |
|---|---|
| *H04L 12/26* | (2006.01) |
| *H04L 45/24* | (2022.01) |
| *H04L 45/00* | (2022.01) |
| *H04L 45/42* | (2022.01) |

(52) U.S. Cl.
CPC .............. *H04L 45/24* (2013.01); *H04L 45/42* (2013.01); *H04L 45/566* (2013.01)

(58) Field of Classification Search
CPC ........ H04L 45/24; H04L 45/42; H04L 45/566
See application file for complete search history.

(56) References Cited

U.S. PATENT DOCUMENTS

| | | | | |
|---|---|---|---|---|
| 11,128,561 | B1 * | 9/2021 | Matthews | ........... H04L 47/6255 |
| 11,184,235 | B2 * | 11/2021 | Filsfils | ................ H04L 47/2483 |
| 2021/0281514 | A1 * | 9/2021 | Guo | .................... H04L 41/0896 |

* cited by examiner

*Primary Examiner* — Kim T Nguyen
(74) *Attorney, Agent, or Firm* — Shield Intellectual Property PC; Zhichong Gu

(57) ABSTRACT

A packet to be forwarded over a computer network to a destination is received. A group of multiple network paths is available to forward to the packet to the destination. One or more path selection factors are determined to be used to identify a specific network load balancing algorithm to select a specific network path from the group of multiple network paths. The one or more path selection factors include at least one path selection factor determined based at least in part on a dynamic state of the computer network or a network node in the computer network. In response to selecting, by the specific network load balancing algorithm, the specific network path from among the group of multiple network paths, the packet is forwarded over the specific network path.

20 Claims, 8 Drawing Sheets

OPTIMIZED PATH SELECTION FOR MULTI-PATH GROUPS

This application claims benefit under 35 U.S.C. § 119(e) of Provisional Application No. 63/354,710, filed Jun. 23, 2022, the entire contents of which is hereby incorporated by reference as if fully set forth herein.

TECHNICAL FIELD

Embodiments relate generally to computer network communications, and, more specifically, to application and state aware multi-path routing resolution.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

At any node in a network, there may be multiple paths of the same or similar or different costs to reach an endpoint or destination. These multiple paths constitute a set or group of paths to the endpoint or destination and may be referred to as a multi-path group (MPG). Example MPG may include, but is not necessarily limited to only, any of: an equal-cost multi-path (ECMP) group comprising a plurality of equal cost paths, a differentiated-cost multi-path group comprising a plurality of paths assigned with differentiated costs or weights, a same weighted path group comprising a plurality of paths assigned with the same weight, etc. When forwarding traffic to the destination, such a node may distribute traffic or packets therein across the multiple paths in the same MPG.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
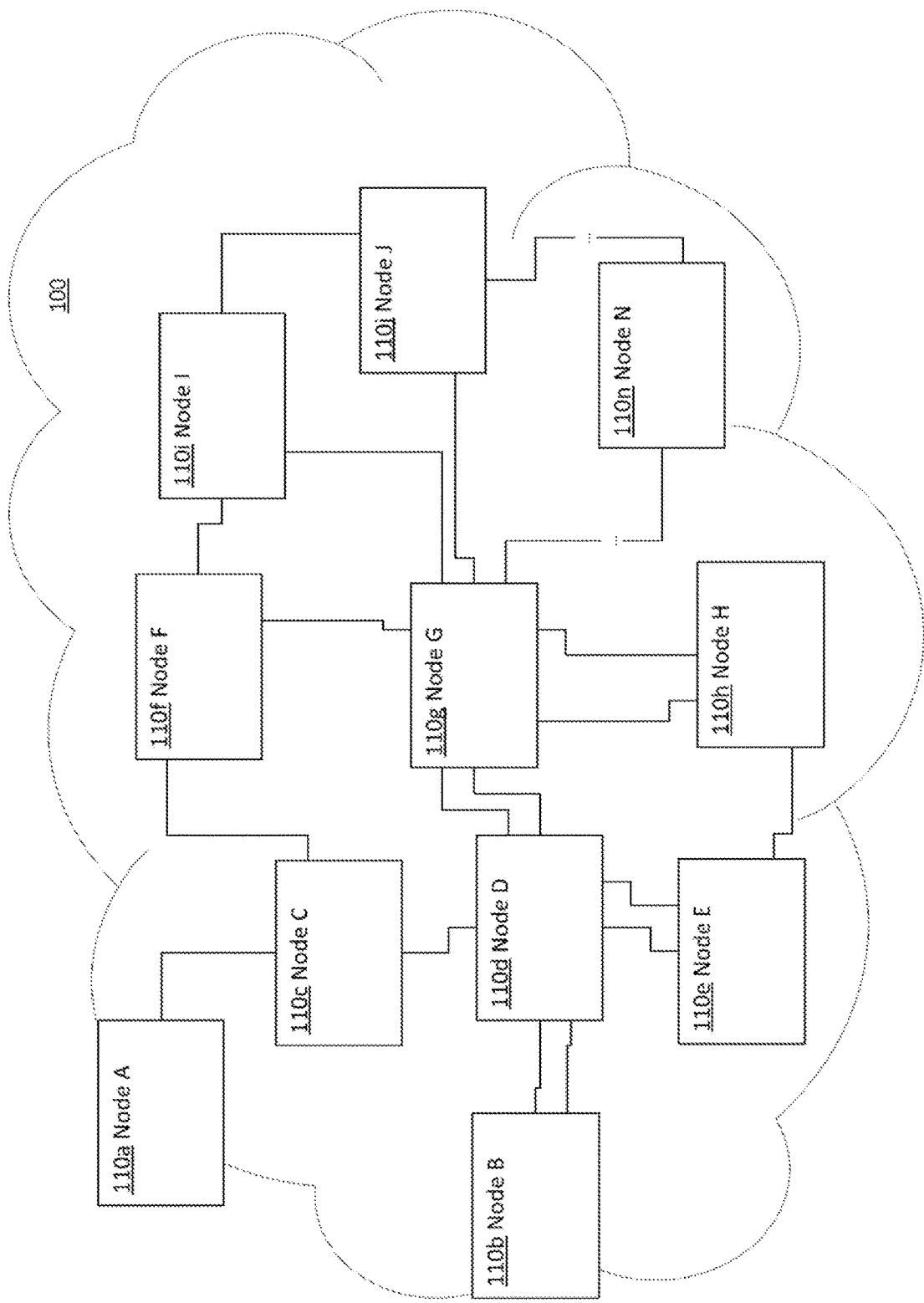
FIG. 1 illustrates an example networking system.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
   2.1. Data Units
   2.2. Network Paths
   2.3. Network Device
   2.4. Ports
   2.5. Packet Processors
   2.6. Buffers
   2.7. Queues
   2.8. Traffic Management
   2.9. Forwarding Logic
   2.10. Path Group Member Selection
   2.11. Miscellaneous
3.0. Functional Overview
   3.1. Application Aware Load Balancing
   3.2. Destination Aware Load Balancing
   3.3. State Aware Load Balancing
   3.4. Packet Age Aware Algorithm Control
   3.5. Path Group State Aware Algorithm Control
   3.6. Example Operational Modes
   3.7. Deployment Examples
4.0. Example Embodiments
5.0. Implementation Mechanism-Hardware Overview
6.0. Extensions and Alternatives

1.0. GENERAL OVERVIEW

A computer network may be used to carry a mix of traffic among or between end point devices or network nodes of the computer network. Some network or packet traffic including but not limited to TCP traffic (or packets carrying TCP segments) in the mix may be sensitive to packet re-ordering. An end point device may perform poorly if packet ordering (e.g., consistent with the order of packet origination, etc.) is not maintained in such network or packet traffic. In comparison, packets relating to some network or packet traffic including but not limited to some remote direct memory access (RDMA) protocols may not be sensitive to packet re-ordering, although other packets relating to some other RDMA protocols may remain sensitive to packet re-ordering. Being capable of handling out-of-order delivery of packets relating to some of these RDMA protocols, an end point device can perform well if these packets are relatively evenly distributed among available network paths with or without packet re-ordering.

Under some other approaches, given a multi-path group (MPG) of multiple network paths as identified or selected by IP routing lookup operations based on a destination, all packets of a mix of different network or computing applications—e.g., TCP based applications, RDMA based applications, UDP based applications, etc.—to be forwarded to the same destination may be forwarded over network paths selected from the group using the same load balancing algorithm.

As these packets may be originated or generated from different computing or network applications, a one-size-fits-all approach that uses the same load balancing algorithm for all the packets sharing the same destination but relating to different computing or network applications likely results in suboptimal solutions and performance problems for some if not all these applications.

For example, if the same load balancing algorithm—adopted for or applied to the mix of different traffics—distributes successive packets in the mix of different traffics to different paths in the group in a round robin or random spraying manner, RDMA traffic may perform well as RDMA end points are capable of handling out-of-order packets. In comparison, with out-of-order traffic caused by fast switching successive packets to different network paths, TCP will suffer excessive retransmissions that will result in significant drop in throughput.

On the other hand, if the same load balancing algorithm—adopted for or applied to the mix of different traffics—distributes successive packets in the mix of different traffics using static hash-based selection (which computes a hash value based on packet fields of a packet and uses the hash value to select an available path; packets that generate the same hash value will remain at the same path), TCP traffic may perform well as an end point receives packets in the same order in which the packets are originated but the RDMA traffic may experience relatively high latency due to relatively high utilization or loading in the selected network path(s).

In contrast to these other approaches, techniques as described herein can be implemented to adaptively identify or select a specific load balancing algorithm among different load balancing algorithms based in part or in whole on a number of member or path selection factors. Instead of using the same load balancing algorithm to select paths for forwarding received packets regardless of underlying network or computing applications from which these packets are originated, the underlying applications may be determined under these techniques and used as a part of the selection factors to identify or select the specific load balancing algorithm.

As used herein, a multi-path group (MPG) refer to a group of available or candidate network paths for forwarding or routing packets to the same destination. Example MPGs may include, but are not necessarily limited to only, any, some or all of: differentiated-cost multi-path groups each comprising a plurality of paths assigned with differentiated costs or weights, same weighted path groups each comprising a plurality of paths assigned with the same weight, ECMP groups, link aggregation groups (LAGs), and so on. An ECMP group may refer to a group of equal-cost network paths corresponding to a given destination. An MPG as described herein—including but not limited to an ECMP group—may be identified, determined and/or selected using IP route lookup operations based in part or in whole on the destination.

There are multiple load balancing algorithms for distributing traffic or packets to the same destination across multiple paths in an MPG. Example load balancing algorithms may include, but are not necessarily limited to only, any of: dynamic load balancing, hash-based selection, round robin spraying, random spraying, and so on. Each of the load balancing algorithms has its own characteristics as compared with others of the load balancing algorithms. For example, some algorithms may maintain packet ordering in a traffic (or packet) flow, while others may re-order packets of the same traffic flow. A traffic flow may be a plurality of successive packets from a given source to a given destination. Additionally, optionally or alternatively, other flow determining attributes such as ports, protocols, etc., may be used to classify packets into different flows.

Some load balancing (or path selection) algorithms may be congestion aware or operate differently or adaptively according to different congestion conditions at runtime. Some load balancing (or path selection) algorithms may try to optimize utilization of one or more specific network paths or all of the network paths in the group.

By way of example but not limitation, TCP and RDMA traffics are to be forwarded by a network node or switching device in a computer network to the same destination. These traffics are mapped by IP route lookup operations performed by the network node to the same MPG having multiple available paths to the same destination. Under techniques as described herein, different load balancing algorithms can be identified or selected by the network node based on selection factors.

A first load balancing algorithm including but not limited to static hash-based member selection or a variant thereof may be identified, selected and/or applied to forwarding TCP segments or packets in the TCP traffic, whereas a second different load balancing algorithm including but not limited to round robin spraying or a variant thereof may be identified, selected and/or applied to forwarding RDMA related packets in the RDMA traffic.

As the TCP traffic is sensitive to packet re-ordering in the network, the first load balancing algorithm can maintain packet ordering (e.g., conversational order, etc.) in the same order in which the TCP segments or packets in the TCP traffic (e.g., in a conversation between two end points, etc.) are originated by a TCP-based computing application. Hence, if two successive packets in the TCP traffic are not separated by a sufficient time difference (e.g., as compared with a time difference threshold used to ensure packet ordering), the first load balancing algorithm may direct or distribute the second of the two successive packets to the same path used to forward the first of the two successive packets. On the other hand, if two successive packets in the TCP traffic are separated by the sufficient time difference, the first load balancing algorithm may direct or distribute the second of the two successive packets to a least used path, which may or may not be the same path used to forward the first of the two successive packets, so that latency may be reduced for the second packet.

As the RDMA protocol supports spraying traffic (e.g., evenly, etc.) across all available (or possible) paths because the RDMA protocol end points (or end point devices) are capable of handling out-of-order delivery of packets, the second load balancing algorithm can distribute the non-TCP packets in the RDMA traffic based on utilization or loading states of the available paths. Hence, if those paths are evenly utilized or loaded, then the second load balancing algorithm can direct or distribute the RDMA traffic evenly across all these paths. On the other hand, if these paths are not evenly utilized or loaded, then the second load balancing algorithm can direct or distribute the RDMA traffic unevenly across all these paths to rebalance loads on these paths.

Approaches, techniques, and mechanisms are disclosed for routing packets over a group of multiple paths. A packet to be forwarded over a computer network to a destination is received. A group of multiple network paths is available to forward to the packet to the destination. One or more path selection factors are determined to be used to identify a specific network load balancing algorithm to select a specific network path from the group of multiple network paths. The one or more path selection factors include at least one path selection factor determined based at least in part on a dynamic state of the computer network or a network node in the computer network. In response to selecting, by the specific network load balancing algorithm, the specific network path from among the group of multiple network paths, the packet is forwarded over the specific network path.

In other aspects, the inventive subject matter encompasses computer apparatuses and/or computer-readable media configured to carry out the foregoing techniques.

2.0. STRUCTURAL OVERVIEW

FIG. 1 illustrates example aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a unit of data at the network layer (e.g., a TCP segment, etc.) to a second node 110 over a path that includes an intermediate node 110. This unit of data may be broken into smaller units of data at various sublevels before it is transmitted from the first node 110. These smaller data units may be referred to as "subunits" or "portions" of the larger data unit.

For example, a TCP segment may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild certain subunits of data (e.g., frames and/or cells, etc.) and route those subunits to the second node 110 without ever composing the entire original data unit.

When a node 110 receives a unit of data, it typically examines addressing information within the unit of data (and/or other information within the unit of data) to determine how to process the unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the unit of data, a label to attach the unit of data, etc. In cases where multiple paths (e.g., over the same port, over different ports, etc.) to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g., a "five-tuple" combination of a source address, source port, destination address, destination port, and protocol, etc.). A flow is often intended to be sent in sequence, and network devices are therefore typically configured to send all data units within a given flow along a same path to ensure that the flow is received in sequence.

A node 110 may operate on network data at several different layers, and therefore view the same data as belonging to several different types of data units.

2.2. Network Paths

Any node in the depicted network 100 may communicate with any other node in the network 100 by sending data units through a series of nodes 110 and links, referred to as a path. For example, Node B (110b) may send data units to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g., which egress port it should send the data unit out on, etc.). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

Figure 2:
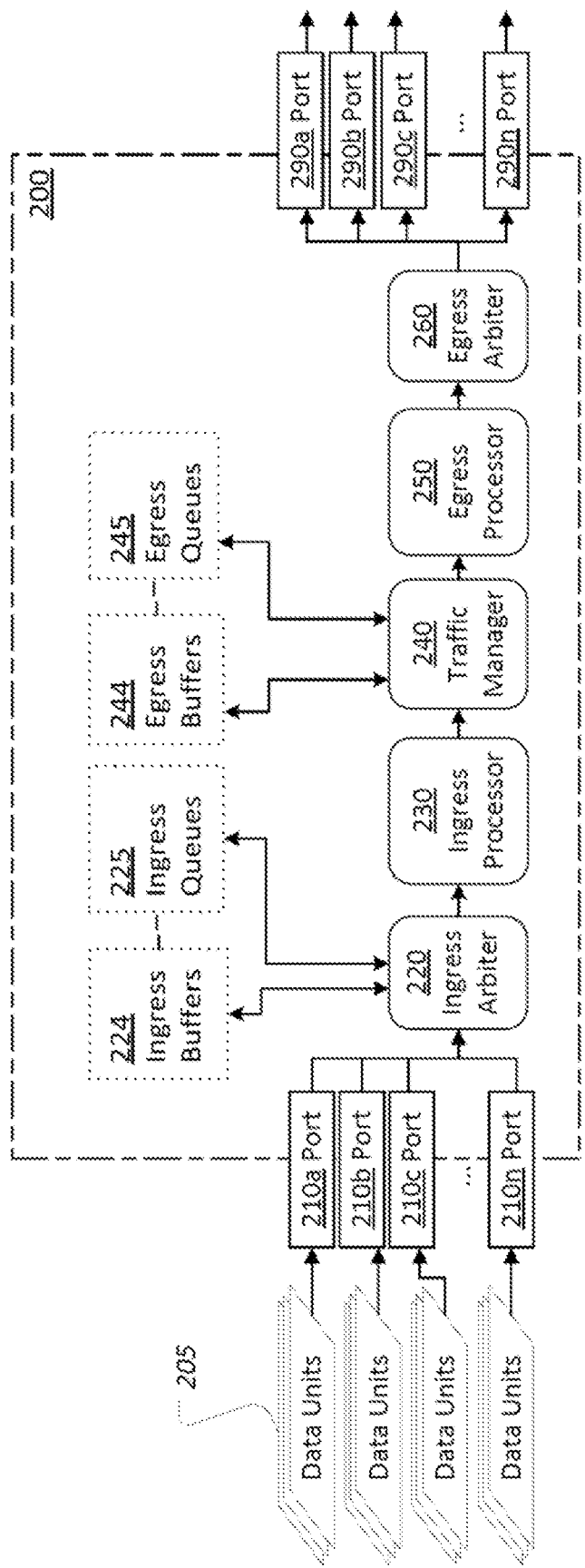
FIG. 2 illustrates an example network device.

FIG. 2 illustrates example aspects of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network 100, by means of a series of operations performed at various components within the device 200. Note that, in an embodiment, some or all of the nodes 110 in system such as network 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 205 through various subcomponents of the forwarding logic of device 200 is as follows. After being received via a port 210, a data unit 205 may be buffered in an ingress buffer 224 and queued in an ingress queue 225 by an ingress arbiter 220 until the data unit 205 can be processed by an ingress packet processor 230, and then delivered to an interconnect (or a cross connect) such as a switching fabric. From the interconnect, the data unit 205 may be forwarded to a traffic manager 240. The traffic manager 240 may store the data unit 205 in an egress buffer 244 and assign the data unit 205 to an egress queue 245. The traffic manager 240 manages the flow of the data unit 205 through the egress queue 245 until the data unit 205 is released to an egress packet processor 250. Depending on the processing, the traffic manager 240 may then assign the data unit 205 to another queue so that it may be processed by yet another egress processor 250, or the egress packet processor 250 may send the data unit 205 to an egress arbiter 260 which temporally stores or buffers the data unit 205 in a transmit buffer and finally forwards out the data unit via another port 290. Of course, depending on the embodiment, the forwarding logic may omit some of these subcomponents and/or include other subcomponents in varying arrangements.

Example components of a device 200 are now described in further detail.

2.4. Ports

Network device 200 includes ports 210/290. Ports 210, including ports 210a through 210n, are inbound ("ingress") ports by which data units referred to herein as data units 205 are received over a network, such as network 110. Ports 290, including ports 290a through 290n, are outbound ("egress") ports by which at least some of the data units 205 are sent out to other destinations within the network, after having been processed by the network device 200.

Egress ports 290 may operate with corresponding transmit buffers to store data units or subunits (e.g., packets, cells, frames, transmission units, etc.) divided therefrom that are to be transmitted through ports 290. Transmit buffers may have one-to-one correspondence relationships with ports 290, many-to-one correspondence with ports 290, and so on. Egress processors 250 or egress arbiters 260 operating with egress processors 250 may output these data units or subunits to transmit buffers before these units/subunits are transmitted out from ports 290.

Data units 205 may be of any suitable PDU type, such as packets, cells, frames, transmission units, etc. In an embodiment, data units 205 are packets. However, the individual atomic data units upon which the depicted components may operate may actually be subunits of the data units 205. For example, data units 205 may be received, acted upon, and transmitted at a cell or frame level. These cells or frames may be logically linked together as the data units 205 (e.g., packets, etc.) to which they respectively belong for purposes of determining how to handle the cells or frames. However, the subunits may not actually be assembled into data units 205 within device 200, particularly if the subunits are being forwarded to another destination through device 200.

Ports 210/290 are depicted as separate ports for illustrative purposes, but may actually correspond to the same physical hardware ports (e.g., network jacks or interfaces, etc.) on the network device 210. That is, a network device 200 may both receive data units 205 and send data units 205 over a single physical port, and the single physical port may thus function as both an ingress port 210 (e.g., one of 210a, 210b, 210c, . . . 210n, etc.) and egress port 290. Nonetheless, for various functional purposes, certain logic of the network device 200 may view a single physical port as a separate ingress port 210 and a separate egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in some operational scenarios, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 230. On the other end, an egress packet processor 250 may input data units serially into another SerDes block, which outputs the data units in parallel to ports 290.

2.5. Packet Processors

A device 200 comprises one or more packet processing components that collectively implement forwarding logic by which the device 200 is configured to determine how to handle each data unit 205 that the device 200 receives. These packet processors components may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 230 and 250 may be configured to perform different packet processing tasks. These tasks may include, for example, identifying paths along which to forward data units 205, forwarding data units 205 to egress ports 290, implementing flow control and/or other policies, manipulating packets, performing statistical or debugging operations, and so forth. A device 200 may comprise any number of packet processors 230 and 250 configured to perform any number of processing tasks.

In an embodiment, the packet processors 230 and 250 within a device 200 may be arranged such that the output of one packet processor 230 or 250 may, eventually, be inputted into another packet processor 230 or 250, in such a manner as to pass data units 205 from certain packet processor(s) 230 and/or 250 to other packet processor(s) 230 and/or 250 in a sequence of stages, until finally disposing of the data units 205 (e.g., by sending the data units 205 out an egress port 290, "dropping" the data units 205, etc.). The exact set and/or sequence of packet processors 230 and/or 250 that process a given data unit 205 may vary, in some embodiments, depending on the attributes of the data unit 205 and/or the state of the device 200. There is no limit to the number of packet processors 230 and/or 250 that may be chained together in such a manner.

Based on decisions made while processing a data unit 205, a packet processor 230 or 250 may, in some embodiments, and/or for certain processing tasks, manipulate a data unit 205 directly. For instance, the packet processor 230 or 250 may add, delete, or modify information in a data unit header or payload. In other embodiments, and/or for other processing tasks, a packet processor 230 or 250 may generate control information that accompanies the data unit 205, or is merged with the data unit 205, as the data unit 205 continues through the device 200. This control information may then be utilized by other components of the device 200 to implement decisions made by the packet processor 230 or 250.

In an embodiment, a packet processor 230 or 250 need not necessarily process an entire data unit 205, but may rather only receive and process a subunit of a data unit 205 comprising header information for the data unit. For instance, if the data unit 205 is a packet comprising multiple cells, the first cell, or a first subset of cells, might be forwarded to a packet processor 230 or 250, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 230 or an egress packet processor 250. Generally, an ingress processor 230 resolves destinations for a traffic manager 240 to determine which egress ports 290 (e.g., one of 290a, 290b, 290c, . . . 290n, etc.) and/or queues a data unit 205 should depart from. There may be any number of ingress processors 230, including just a single ingress processor 230.

In an embodiment, an ingress processor 230 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, and so forth. Once the appropriate intake task(s) have been performed, the data units 205 are forwarded to an appropriate traffic manager 240, to which the ingress processor 230 may be coupled directly or via various other components, such as an interconnect component.

The egress packet processor(s) 250 of a device 200, by contrast, may be configured to perform non-intake tasks necessary to implement the forwarding logic of the device 200. These tasks may include, for example, tasks such as identifying paths along which to forward the data units 205, implementing flow control and/or other policies, manipulating data units, performing statistical or debugging operations, and so forth. In an embodiment, there may be different egress packet processors(s) 250 assigned to different flows or other categories of traffic, such that not all data units 205 will be processed by the same egress packet processor 250.

In an embodiment, each egress processor 250 is coupled to a different group of egress ports 290 to which they may send data units 205 processed by the egress processor 250. In an embodiment, access to a group of ports 290 or corresponding transmit buffers for the ports 290 may be regulated via an egress arbiter 260 coupled to the egress packet processor 250. In some embodiments, an egress processor 250 may also or instead be coupled to other potential destinations, such as an internal central processing unit, a storage subsystem, or a traffic manager 240.

2.6. Buffers

Since not all data units 205 received by the device 200 can be processed by component(s) such as the packet processor(s) 230 and/or 250 and/or ports 290 at the same time, various components of device 200 may temporarily store data units 205 in memory structures referred to as (e.g., ingress, egress, etc.) buffers while the data units 205 are waiting to be processed. For example, a certain packet processor 230 or 250 or port 290 may only be capable of processing a certain amount of data such as a certain number of data units 205, or portions of data units 205, in a given clock cycle, meaning that other data units 205, or portions of data units 205, destined for the packet processor 230 or 250 or port 290 must either be ignored (e.g., dropped, etc.) or stored. At any given time, a large number of data units 205 may be stored in the buffers of the device 200, depending on network traffic conditions.

A device 200 may include a variety of buffers, each utilized for varying purposes and/or components. Generally, a data unit 205 awaiting processing by a component is held in a buffer associated with that component until the data unit 205 is "released" to the component for processing.

Buffers may be implemented using any number of distinct banks of memory. Each bank may be a portion of any type of memory, including volatile memory and/or non-volatile memory. In an embodiment, each bank comprises many addressable "entries" (e.g., rows, columns, etc.) in which data units 205, subunits, linking data, or other types of data, may be stored. The size of each entry in a given bank is known as the "width" of the bank, while the number of entries in the bank is known as the "depth" of the bank. The number of banks may vary depending on the embodiment.

Each bank may have associated access limitations. For instance, a bank may be implemented using single-ported memories that may only be accessed once in a given time slot (e.g., clock cycle, etc.). Hence, the device 200 may be configured to ensure that no more than one entry need be read from or written to the bank in a given time slot. A bank may instead be implemented in a multi-ported memory to support two or more accesses in a given time slot. However, single-ported memories may be desirable in many cases for higher operating frequencies and/or reducing costs.

In an embodiment, in addition to buffer banks, a device may be configured to aggregate certain banks together into logical banks that support additional reads or writes in a time slot and/or higher write bandwidth. In an embodiment, each bank, whether logical or physical or of another (e.g., addressable, hierarchical, multi-level, sub bank, etc.) organization structure, is capable of being accessed concurrently with each other bank in a same clock cycle, though full realization of this capability is not necessary.

Some or all of the components in device 200 that utilize one or more buffers may include a buffer manager configured to manage use of those buffer(s). Among other processing tasks, the buffer manager may, for example, maintain a mapping of data units 205 to buffer entries in which data for those data units 205 is stored, determine when a data unit 205 must be dropped because it cannot be stored in a buffer, perform garbage collection on buffer entries for data units 205 (or portions thereof) that are no longer needed, and so forth.

A buffer manager may include buffer assignment logic. The buffer assignment logic is configured to identify which buffer entry or entries should be utilized to store a given data unit 205, or portion thereof. In some embodiments, each data unit 205 is stored in a single entry. In yet other embodiments, a data unit 205 is received as, or divided into, constituent data unit portions for storage purposes. The buffers may store these constituent portions separately (e.g., not at the same address location or even within the same bank, etc.). The one or more buffer entries in which a data unit 205 are stored are marked as utilized (e.g., in a "free" list, free or available if not marked as utilized, etc.) to prevent newly received data units 205 from overwriting data units 205 that are already buffered. After a data unit 205 is released from the buffer, the one or more entries in which the data unit 205 is buffered may then be marked as available for storing new data units 205.

In some embodiments, the buffer assignment logic is relatively simple, in that data units 205 or data unit portions are assigned to banks and/or specific entries within those banks randomly or using a round-robin approach. In some embodiments, data units 205 are assigned to buffers at least partially based on characteristics of those data units 205, such as corresponding traffic flows, destination addresses, source addresses, ingress ports, and/or other metadata. For example, different banks may be utilized to store data units 205 received from different ports 210 or sets of ports 210. In an embodiment, the buffer assignment logic also or instead utilizes buffer state information, such as utilization metrics, to determine which bank and/or buffer entry to assign to a data unit 205, or portion thereof. Other assignment considerations may include buffer assignment rules (e.g., no writing two consecutive cells from the same packet to the same bank, etc.) and I/O scheduling conflicts, for example, to avoid assigning a data unit to a bank when there are no available write operations to that bank on account of other components reading content already in the bank.

2.7. Queues

In an embodiment, to manage the order in which data units 205 are processed from the buffers, various components of a device 200 may implement queueing logic. For example, the flow of data units through ingress buffers 224 may be managed using ingress queues 225 while the flow of data units through egress buffers 244 may be managed using egress queues 245.

Each data unit 205, or the buffer locations(s) in which the data unit 205 is stored, is said to belong to one or more constructs referred to as queues. Typically, a queue is a set of memory locations (e.g., in the buffers 224 and/or 244, etc.) arranged in some order by metadata describing the queue. The memory locations may (and often are) non-contiguous relative to their addressing scheme and/or physical or logical arrangement. For example, the metadata for one queue may indicate that the queue is comprised of, in order, entry addresses 2, 50, 3, and 82 in a certain buffer.

In many embodiments, the sequence in which the queue arranges its constituent data units 205 generally corresponds to the order in which the data units 205 or data unit portions in the queue will be released and processed. Such queues are known as first-in-first-out ("FIFO") queues, though in other embodiments other types of queues may be utilized. In some embodiments, the number of data units 205 or data unit portions assigned to a given queue at a given time may be limited, either globally or on a per-queue basis, and this limit may change over time.

2.8. Traffic Management

According to an embodiment, a device 200 further includes one or more traffic managers 240 configured to control the flow of data units to one or more packet processor(s) 230 and/or 250. For instance, a buffer manager within the traffic manager 240 may temporarily store data units 205 in buffers 244 as they await processing by egress processor(s) 250. A traffic manager 240 may receive data units 205 directly from a port 210, from an ingress processor 230, and/or other suitable components of device 200. In an embodiment, the traffic manager 240 receives one TDU from each possible source (e.g. each port 210, etc.) each clock cycle or other time slot.

Traffic manager 240 may include or be coupled to egress buffers 244 for buffering data units 205 prior to sending those data units 205 to their respective egress processor(s) 250. A buffer manager within the traffic manager 240 may temporarily store data units 205 in egress buffers 244 as they await processing by egress processor(s) 250. The number of egress buffers 244 may vary depending on the embodiment. A data unit 205 or data unit portion in an egress buffer 244 may eventually be "released" to one or more egress processor(s) 250 for processing, by reading the data unit 205 from the (e.g., egress, etc.) buffer 244 and sending the data unit 205 to the egress processor(s) 250. In an embodiment, traffic manager 240 may release up to a certain number of data units 205 from buffers 244 to egress processors 250 each clock cycle or other defined time slot.

Beyond managing the use of buffers 244 to store data units 205 (or copies thereof), a traffic manager 240 may include queue management logic configured to assign buffer entries to queues and manage the flow of data units 205 through the queues. The traffic manager 240 may, for instance, identify a specific queue to assign a data unit 205 to upon receipt of the data unit 205. The traffic manager 240 may further determine when to release—also referred to as "dequeuing" data units 205 (or portions thereof) from queues and provide those data units 205 to specific packet processor(s) 250. Buffer management logic in the traffic manager 240 may further "deallocate" entries in a buffer 244 that store data units 205 are no longer linked to the traffic manager's queues. These entries are then reclaimed for use in storing new data through a garbage collection process.

In an embodiment, different queues may exist for different destinations. For example, each port 210 and/or port 290 may have its own set of queues. The queue to which an incoming data unit 205 is assigned and linked may, for instance, be selected based on forwarding information indicating which port 290 the data unit 205 should depart from. In an embodiment, a different egress processor 250 may be associated with each different set of one or more queues. In an embodiment, the current processing context of the data unit 205 may be used to select which queue a data unit 205 should be assigned to.

In an embodiment, there may also or instead be different queues for different flows or sets of flows. That is, each identifiable traffic flow or group of traffic flows is assigned its own set of queues to which its data units 205 are respectively assigned. In an embodiment, different queues may correspond to different classes of traffic or quality-of-service (QoS) levels. Different queues may also or instead exist for any other suitable distinguishing properties of the data units 205, such as source address, destination address, packet type, and so forth.

Device 200 may comprise any number (e.g., one or more, etc.) of packet processors 230 and/or 250 and traffic managers 240. For instance, different sets of ports 210 and/or ports 290 may have their own traffic manager 240 and packet processors 230 and/or 250. As another example, in an embodiment, the traffic manager 240 may be duplicated for some or all of the stages of processing a data unit. For example, system 200 may include a traffic manager 240 and egress packet processor 250 for an egress stage performed upon the data unit 205 exiting the system 200, and/or a traffic manager 240 and packet processor 230 or 250 for any number of intermediate stages. The data unit 205 may thus pass through any number of traffic managers 240 and/or packet processors 230 and/or 250 prior to exiting the system 200. In other embodiments, only a single traffic manager 240 is needed. If intermediate processing is needed, flow of a data unit 205 may "loop back" to the traffic manager 240 for buffering and/or queuing after each stage of intermediate processing.

In an embodiment, a traffic manager 240 is coupled to the ingress packet processor(s) 230, such that data units 205 (or portions thereof) are assigned to buffers only upon being initially processed by an ingress packet processor 230. Once in an egress buffer 244, a data unit 205 (or portion thereof) may be "released" to one or more egress packet processor(s) 250 for processing, either by the traffic manager 240 sending a link or other suitable addressing information for the corresponding buffer 244 to the egress packet processor 250, or by sending the data unit 205 directly.

In the course of processing a data unit 205, a device 200 may replicate a data unit 205 one or more times for purposes such as, without limitation, multicasting, mirroring, debugging, and so forth. For example, a single data unit 205 may be replicated to multiple egress queues 245. For instance, a data unit 205 may be linked to separate queues for each of ports 1, 3, and 5. As another example, a data unit 205 may be replicated a number of times after it reaches the head of a queue (e.g., for different egress processors 250, etc.). Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual copy of the data unit 205 in buffers, or a single copy of the data unit 205 may be linked from a single buffer location to multiple queues at the same time.

2.9. Forwarding Logic

The logic by which a device 200 determines how to handle a data unit 205—such as where and whether to send a data unit 205, whether to perform additional processing on a data unit 205, etc.—is referred to as the forwarding logic of the device 200. This forwarding logic is collectively implemented by a variety of the components of the device 200, such as described above. For example, an ingress packet processor 230 may be responsible for resolving the destination of a data unit 205 and determining the set of actions/edits to perform on the data unit 205, and an egress packet processor 250 may perform the edits. Or, the egress packet processor 250 may also determine actions and resolve a destination in some cases. Also, there may be embodiments when the ingress packet processor 230 performs edits as well.

The forwarding logic may be hard-coded and/or configurable, depending on the embodiment. For example, the forwarding logic of a device 200, or portions thereof, may, in some instances, be at least partially hard-coded into one or more ingress processors 230 and/or egress processors 250. As another example, the forwarding logic, or elements thereof, may also be configurable, in that the logic changes over time in response to analyses of state information collected from, or instructions received from, the various components of the device 200 and/or other nodes in the network in which the device 200 is located.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A traffic manager 240 may, for example, implement logic that reads such a table, determines one or more ports 290 to send a data unit 205 to based on the table, and sends the data unit 205 to an egress processor 250 that is coupled to the one or more ports 290.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g., are directed to, etc.) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 210/290. Port state data may include, for instance, flow control state information describing various traffic flows and associated traffic flow control rules or policies, link status information indicating links that are up or down, port utilization information indicating how ports are being utilized (e.g., utilization percentages, utilization states, etc.). Forwarding logic may be configured to implement the associated rules or policies associated with the flow(s) to which a given packet belongs.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit 205 for various reasons. For instance, a traffic manager 240 may determine to drop a data unit 205 because, among other reasons, buffers are overutilized, a queue is over a certain size, and/or a data unit 205 has a certain characteristic.

2.10. Path Group Member Selection

Figure 3A:
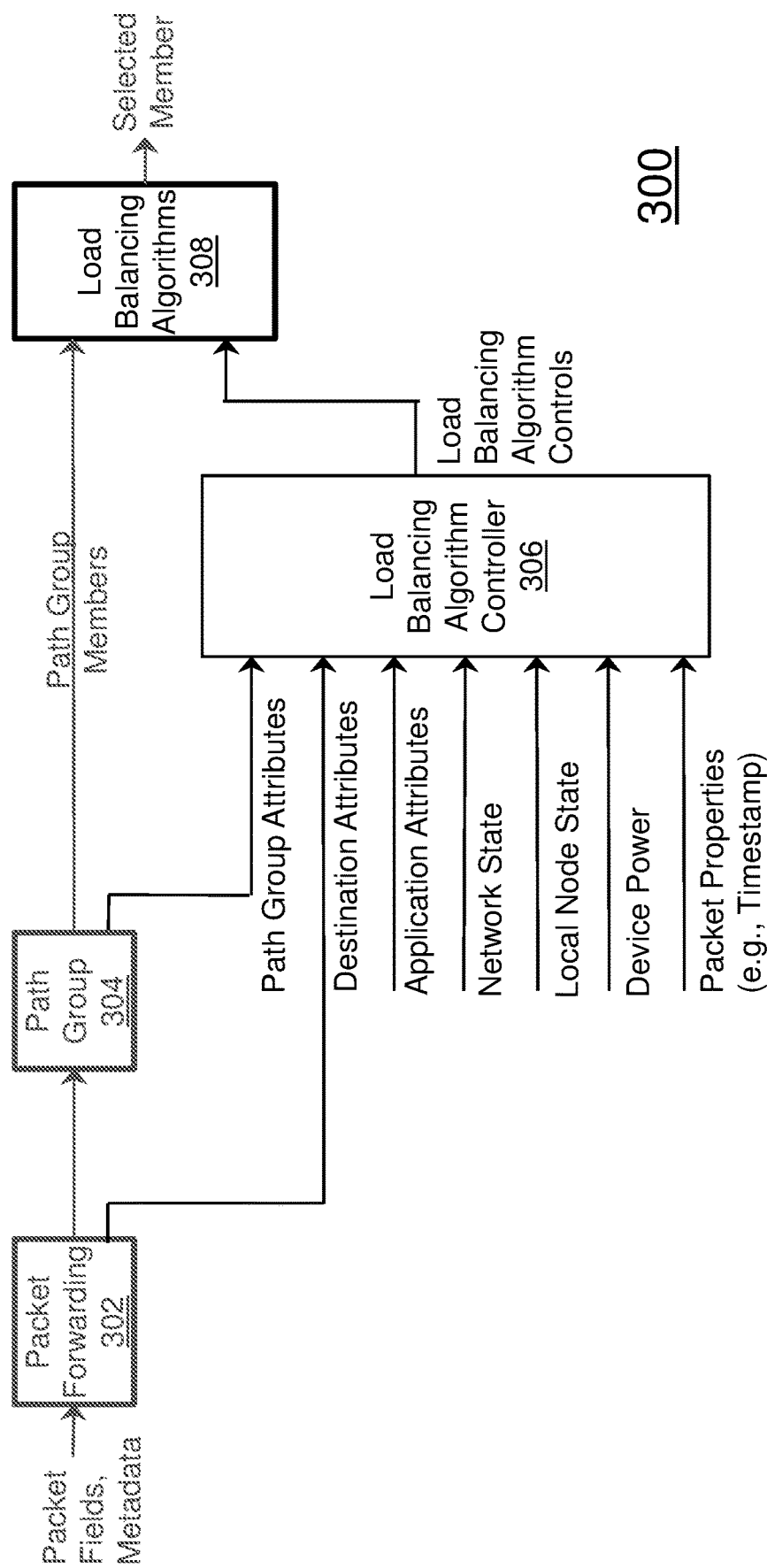
FIG. 3A through FIG. 3D illustrate example application and state aware path selection framework and operations.

FIG. 3A illustrates an example application and state awareMPG path selection framework 300, which may be implemented as a part of a network node such as 200 of FIG. 2 or one or more components/modules (e.g., traffic manager 240 and/or egress packet processor 250, etc.) therein. The framework 300 includes a packet forwarding module 302, a load balancing algorithm controller 306, a plurality of available load balancing algorithms 308, etc. Each block, module, device, system, etc., illustrated in the framework 300 may be collectively or individually implemented with one or more computing devices that comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

The framework 300 includes a packet forwarding module 302 that dequeues or receives a packet to be forwarded to a specific destination. The packet as received by the packet forwarding module 302 may be coded with packet fields including but not limited to a destination address field that specifies the specific destination. Additionally, optionally or alternatively, the packet as received by the packet forwarding module 302 may include or may be accompanied with packet metadata generated or provided by prior packet processing components in the same and/or a different network node.

Based in part or in whole on some or all of the packet fields and/or the packet metadata, the packet forwarding module 302 may perform (e.g., Internet Protocols or IP, etc.) route lookup operations for the purpose of identifying a path group 304 (e.g., a list of available paths, etc.)—e.g., from one or more available path groups—that may be used to forward the received packet. The path group 304 may comprise a plurality of (available group) members representing a plurality of network paths to the destination. Each member in the plurality of members of the path group 304 represent a respective network path in the plurality of network paths.

The framework 300 includes one or more modules that implement a plurality of load balancing algorithms 308. Each algorithm in the plurality of load balancing algorithms 308 can be used to select a specific member (or network path) from the plurality of members (or network paths) in the path group 304.

The framework 300 includes an algorithm controller 306 that receives some or all of: path group attributes in connection with the path group 304, destination attributes generated from the packet forwarding module 302, application attributes, network and/or local node states, device power status, packet properties in connection with the received packet, etc. Based in part or in whole on some or all of the received attributes, states, device power status data and/or packet properties, the algorithm controller 306 can generate one or more load balancing algorithm controls. These controls can identify, select or enable a specific algorithm in the plurality of load balancing algorithms to select a specific member (or network path) for the received packet.

Different load balancing algorithms 308 may be implemented to distribute traffics or packets among members (or network paths) in a path group 304. For each packet to be forwarded via a path group 304, the framework 300 can be used to programmatically, dynamically or adaptively select or choose a specific load balancing algorithm from among the plurality of load balancing algorithms 308, based in part or in whole on a combination of or a subset of user specified and/or system determined application, network and system attributes.

2.11. Miscellaneous

Device 200 and framework 300 illustrate only examples of many possible arrangements of devices configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 100 or a network topology 150.

Furthermore, figures herein illustrate but a few of the various arrangements of memories that may be utilized to implement the described buffering techniques. Other arrangements may include fewer or additional elements in varying arrangements.

3.0. FUNCTIONAL OVERVIEW

Described in this section are various example method flows for implementing various features of the systems and system components described herein. The example method flows are non-exhaustive. Alternative method flows and flows for implementing other features will be apparent from the disclosure.

The various elements of the process flows described below may be performed in a variety of systems, including in one or more devices 500 that utilize some or all of the time sensitive communication mechanisms described herein. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Application Aware Load Balancing

A path selection framework such as 300 of FIG. 3A may be implemented or used to map packets originating from different applications to different load balancing algorithms.

The framework 300 or a load balancing algorithm controller 306 there may determine or receive one or more application attributes of a computing or network application that originates or generates a received packet to be forwarded to a destination via a path group or a selected member therein. The selected member represents a specific network path selected among multiple network paths represented by multiple members of the path group using a specific loading balancing algorithm selected or enabled by the algorithm controller 306 based at least in part on the application attributes.

In some operational scenarios, the application attributes of the application that originates or generates the received packet can be determined with or extracted from packet attributes or packet metadata—as received by the framework 300—of the packet.

Example application attributes may include, but are not necessarily limited to only, any, some or all of: L2/L3 source addresses; destination addresses; IP protocol; L4 source and/or destination ports; tunnel payload fields (e.g., embedded or inner 5-tuple of a transiting VXLAN tunnel, IP tunnel, MPLS, or any other type of tunnel, payload fields of a terminated tunnel, etc.), one or more data fields from an application (e.g., message, etc.) header, class of service; time to live; a tag or signature string marked in or added to the packet by an endpoint, source or intermediate network node, where the tag or signature string (e.g., VLAN tag, unused field or bit(s) of a packet header, an application level field in packet payload, etc.) identifies distinguishing characteristics of the application; incoming port; a preferred load balancing algorithm, and so on.

As used herein, "application attributes" of a computing or network application may refer to a set of operational parameters or attributes that are static, common and/or invariant for all packets of the same computing or network application but are distinguish from other application attributes of other computing or network applications.

Hence, in response to determining, based in part or in whole on the application attributes, that the received packet belongs to or originates from a first application, the load balancing algorithm controller 306 may generate one or more first load balancing algorithm controls to select or enable a first load balancing algorithm (one of 308 of FIG. 3A), among the available load balancing algorithms, that can best perform path selection for the first application. A first member in the path group or a first network path may be selected by the first load balancing algorithm for forwarding the received packet.

On the other hand, in response to determining, based in part or in whole on the application attributes, that the received packet belongs to or originates from a second different application, the load balancing algorithm controller 306 may generate one or more second load balancing algorithm controls to select or enable a second different load balancing algorithm (a different one of 308 of FIG. 3A), among the available load balancing algorithms, that can best perform path selection for the second application. A second member—which may be different from the first member in the previous example—in the path group or a second network path may be selected by the second load balancing algorithm for forwarding the received packet.

3.2. Destination Aware Load Balancing

A path selection framework such as 300 of FIG. 3A may be implemented or used to map packets to different destinations or recipient devices to different load balancing algorithms.

The framework 300 or a load balancing algorithm controller 306 there may determine or receive one or more destination attributes of a destination or recipient device that is to receive a packet to be forwarded to a destination via a path group or a selected member therein. The selected member represents a specific network path selected among multiple network paths represented by multiple members of the path group using a specific loading balancing algorithm selected or enabled by the algorithm controller 306 based at least in part on the destination attributes. The path group 304 may comprise available paths to a single destination or available paths shared by each of multiple destinations. Some destinations may prefer specific load balancing or path selection algorithms as indicated with destination attributes. Some destinations may work with some or all load balancing or path selection algorithms.

The algorithm controller 306 may use destination attributes to select or enable specific load balancing algorithms for specific destinations or recipient devices, regardless of flows (or flow types) or applications (or application types). Additionally, optionally or alternatively, the algorithm controller 306 may use different combinations of destination attributes and other attributes such as application attributes to select or enable specific load balancing algorithms for different combinations of specific destinations or recipient devices and/or packet or traffic flows (or flow types) and/or applications (or application types).

For example, a destination or recipient device may not be able to efficiently handle re-ordered packets in one or more packet and/or traffic flows (or flow types) or in one or more computing or network applications (or application types) and may drop or lose packets while handling re-ordered packets received in a different order from an order used to originate the packets. For such destination or recipient device, a specific load balancing algorithm—the best as compared with other algorithms, etc.—that maintains the original packet ordering may be used to select member(s) or network path(s) in a path group for the flows (or flow types) and/or the applications (or application types).

In comparison, other destinations may be able to efficiently handle re-ordered packets in the flows (or flow types) and/or in the applications (or application types) and may not drop or lose packets while handling re-ordered packets received in a different order from an order used to originate the packets. For such destinations or recipient devices, load balancing algorithms that may or may not maintain the original packet ordering may be used to select member(s) or network path(s) in the path group for the flows (or flow types) and/or the applications (or application types).

In some operational scenarios, the destination attributes of the destination or recipient device can be determined with or extracted from packet attributes or packet metadata such as a destination address—as received by the framework 300—of the packet. Additionally, optionally or alternatively, some or all of the destination attributes may be looked up in a destination attribute data repository by the framework 300 or a component/module (e.g., 302 or 306 of FIG. 3A, etc.) therein, for example using a destination address of the packet as a lookup key.

As used herein, "destination attributes" of a destination or recipient device may refer to a set of operational parameters or attributes that are static, common and/or invariant for all packets to be forwarded to the same destination or recipient device (or the same device type) but are distinct or separate from other destination attributes of other destinations or recipient devices (or other device types).

Hence, in response to determining, based in part or in whole on the destination attributes, that the received packet is to be forwarded to a first destination or recipient device, the load balancing algorithm controller 306 may generate one or more first load balancing algorithm controls to select or enable a first load balancing algorithm (one of 308 of FIG. 3A) that can best perform path selection for packets to be forwarded to the first destination as compared with other load balancing algorithms. A first member in the path group or a first network path may be selected by the first load balancing algorithm for forwarding the received packet.

On the other hand, in response to determining, based in part or in whole on the destination attributes, that the received packet is to be forwarded to a second different destination or recipient device, the load balancing algorithm controller 306 may generate one or more second load balancing algorithm controls to select or enable a second different load balancing algorithm (a different one of 308 of FIG. 3A) that can best perform path selection for the second destination or recipient device as compared with other load balancing algorithms. A second member—which may be different from the first member in the previous example—in the path group or a second network path may be selected by the second load balancing algorithm for forwarding the received packet.

3.3. State Aware Load Balancing

A path selection framework such as 300 of FIG. 3A may be implemented or used to map packets received by a network node (e.g., a switching device, 200 of FIG. 2, etc.) of different device operational states (e.g., a normal operational state, an energy saving operational state, an operational state in which the node is operating with a relatively high temperature, an operational state in which the node is operating with a relatively low temperature, an operational state in which the node is operating at a relatively high power usage, an operational state in which the node is operating at a relatively low power usage, etc.) to different load balancing algorithms.

The framework 300 or a load balancing algorithm controller 306 there may determine or receive one or more state attributes of the network node that is to forward a received packet to a destination via a path group or a selected member therein.

In some operational scenarios, the state attributes of the network node can be determined from dynamic (e.g., operational, state, etc.) parameters of the network node and/or of other network nodes operating in conjunction with the network node and/or of a computer network that includes the network node—regardless of or independent of packet attributes or packet metadata—as received by the network node or the framework 300 implemented thereby—of the packet.

Example state attributes may include, but are not necessarily limited to only, any, some or all of: attributes indicating or representing a network state (as shown in FIG. 3A) of a network that includes the network node; attributes indicating or representing a local node state (as shown in FIG. 3A) of the network node; attributes indicating or representing a device power state (as shown in FIG. 3A) of the network node; and so on.

As used herein, "state attributes" of a network node may refer to a set of operational parameters or attributes that are static, common and/or invariant for all packets processed by the network node operating in a specific node or network state (representing a specific dynamic state of the operational environment of the network node) but are distinct or separate from other state attributes of the network node in other node or network states (representing other dynamic states of the operational environment of the network node). A network state or one or more state attributes of a network may be obtained from a host CPU of a network node, from neighboring network nodes to the network node, etc. Some or all network nodes in the network may be communicatively linked and exchanged state attributes of the network or nodes therein between or among the network nodes. States or state attributes of the network nodes or network or components therein can be delivered in band or out of band. In some operational scenarios, in-band state attributes can be delivered with packets that are to be load balanced with a path group. Additionally, optionally or alternatively, dedicated end-to-end links and/or dedicated packets may be implemented or used between or among neighboring or non-neighboring nodes to exchange states or state attributes as described herein.

Hence, in response to determining, based in part or in whole on the state attributes representing a first dynamic state of the operational environment of the network node, the load balancing algorithm controller 306 may generate one or more first load balancing algorithm controls to select or enable a first load balancing algorithm (one of 308 of FIG. 3A) that can best perform path selection by the network node operating in the first dynamic state as compared with other load balancing algorithms. A first member in the path group or a first network path may be selected by the first load balancing algorithm for forwarding the received packet.

On the other hand, in response to determining, based in part or in whole on the state attributes representing a second different dynamic state of the operational environment of the network node, the load balancing algorithm controller 306 may generate one or more second load balancing algorithm controls to select or enable a second different load balancing algorithm (a different one of 308 of FIG. 3A) that can best perform path selection by the network node operating in the second dynamic state as compared with other load balancing algorithms. A second member—which may be different from the first member in the previous example—in the path group or a second network path may be selected by the second load balancing algorithm for forwarding the received packet.

In some operational scenarios, in which the network that includes the network node is not very loaded (e.g., as compared with user- and/or system-configured network load thresholds, etc.), the load balancing algorithm controller 306 may select or enable one or more load balancing algorithms (which may alternatively be referred to as path/member resolution algorithms, path/member selection algorithms, etc.) that maintains packet ordering in received packets to a destination, regardless of or independent of applications originating the packets and/or regardless of whether the selected load balancing algorithms evenly distribute packets across members (or network paths) in a path group.

In comparison, in some operational scenarios, in which the network that includes the network node is loaded (e.g., as compared with user- and/or system-configured network load thresholds, etc.), the load balancing algorithm controller 306 may select or enable one or more load balancing algorithms that relatively evenly distribute received packets to a destination across members (or network paths) in a path group. The load balancing algorithms may or may not maintain packet ordering in the received packets to the destination. Additionally, optionally or alternatively, the load balancing algorithms may or may not be further selected or enabled based on applications or application attributes or other non-application non-state attributes.

In some operational scenarios, in which the (local) network node or switching device is not very loaded (e.g., as compared with user- and/or system-configured local node load thresholds, etc.), the load balancing algorithm controller 306 may select or enable one or more load balancing algorithms that are relatively static and maintains packet ordering in received packets to a destination, regardless of or independent of applications originating the packets and/or regardless of whether the selected load balancing algorithms evenly distribute packets across members (or network paths) in a path group.

In comparison, in some operational scenarios, in which the (local) network node or switching device is loaded (e.g., as compared with user- and/or system-configured local node load thresholds, etc.), the load balancing algorithm controller 306 may select or enable one or more load balancing algorithms that are relatively dynamic and relatively evenly distribute received packets to a destination across members (or network paths) in a path group. The load balancing algorithms may or may not maintain packet ordering in the received packets to the destination. Additionally, optionally or alternatively, the load balancing algorithms may or may not be further selected or enabled based on applications or application attributes or other non-application non-state attributes.

In some operational scenarios, in which the network node or switching device is not operating with a relatively high device power consumption (e.g., as compared with user- and/or system-configured device power ratings or capacities, etc.) and/or a relatively high temperature (e.g., as compared with an ambient temperature or user- and/or system-configured temperature threshold, etc.), the load balancing algorithm controller 306 may select or enable a relatively large set of load balancing algorithms that can be further selected or enabled based on other attributes.

In comparison, in some operational scenarios, in which the network node or switching device is operating with a relatively high device power consumption (e.g., as compared with user- and/or system-configured device power ratings or capacities, etc.) and/or a relatively high temperature (e.g., as compared with an ambient temperature or user- and/or system-configured temperature threshold, etc.), the load balancing algorithm controller 306 may select or enable a relatively small set of load balancing algorithms that can be further selected or enabled based on other attributes.

3.4. Packet Age Aware Algorithm Control

In addition to or in place of the foregoing (types of) attributes, other (types of) attributes can also be used by a path selection framework such as 300 of FIG. 3A to map packets received by a network node (e.g., a switching device, 200 of FIG. 2, etc.) to different load balancing algorithms.

These other attributes may include, but are not necessarily limited to: packet properties of FIG. 3A such as timestamps/ages of network traffics or packets as received in a computer network that includes the network node. An age of a packet may refer to an elapsed time duration as measured from a first time (e.g., a timestamp, etc.) of reception by a computer network or a network node therein of a packet to a second time at which a load balancing algorithm is to be used to select a member (or a network path) in a path group.

Time synchronization protocol operations such as relating to IEEE 1588 may be performed between or among some or all network nodes of the network and/or some or all end point devices (representing origins or destinations of network traffics or packets) such that packet properties such as packet fields or packet metadata indicating a timestamp or age of a packet by an end point device (e.g., the originating device, etc.) or a previous network node (e.g., the network node receiving a packet from an end point device, etc.) are accurately or correctly interpreted by the network node implementing the framework 300.

In some operational scenarios, older network traffics or packets as indicated by their respective timestamps/ages as indicated by packet fields and/or packet metadata of these traffics or packets are treated differently or mapped to different load balancing or path selection algorithms than younger network traffics or packets. etc.). The network nodes may be time-synchronized or may interpret packet ages from received time information stamped by other nodes based on a common notion of time (e.g., established peer-to-peer in relation to each other, established with a common reference time, etc.). Additionally, optionally or alternatively, in some operational scenarios, some or all timestamps/ages of packets may be used as a part of basis to infer network (or network node) states or conditions in real time or near real time. For example, a method or algorithm may be implemented or performed to determine or calculate an age of a packet as (Current time−ingress timestamp in the packet), where ingress timestamp represents the time when the packet entered the network from an end user device or an edge node. The method or algorithm may be used to determine further whether the age of a packet is relatively old or young using (comparison with) one or more configured age thresholds.

Hence, in response to determining, based in part or in whole on packet properties of a received packet indicating a first age of the packet in the network such as a relatively old age, the load balancing algorithm controller 306 may generate one or more first load balancing algorithm controls to select or enable a first load balancing algorithm (one of 308 of FIG. 3A) that can best perform path selection for the received packet with the first age as compared with other load balancing algorithms. A first member in the path group or a first network path such as a relatively fast network path may be selected by the first load balancing algorithm for forwarding the received packet.

On the other hand, in response to determining, based in part or in whole on packet properties of a received packet indicating a second age of the packet in the network such as a relatively young age, the load balancing algorithm controller 306 may generate one or more second load balancing algorithm controls to select or enable a second load balancing algorithm (one of 308 of FIG. 3A) that can best perform path selection for the received packet with the second age as compared with other load balancing algorithms. A second member in the path group or a second network path such as a less used network path for the purpose of load balancing among some or all available paths of the path group may be selected by the second load balancing algorithm for forwarding the received packet.

3.5. Path Group State Aware Algorithm Control

In addition to or in place of the foregoing (types of) attributes, other attributes indicating or representing path group states can also be used by a path selection framework such as 300 of FIG. 3A to map packets received by a network node (e.g., a switching device, 200 of FIG. 2, etc.) to different load balancing algorithms.

These other attributes may include, but are not necessarily limited to only: path group attributes, aggregated loads of a path group, aggregated or individual loads of some or all members (or network paths) of a path group; aggregated real time operational statuses of a path group; aggregated or individual real time operational statuses (e.g., in service, out-of-service, plugged in, unplugged, etc.) of some or all members (or network paths) of a path group; etc. Example path group attributes may include, but are necessarily limited to only, any, some or all of: path member identifiers, path member statuses, load balancing algorithm(s) specifically configured for a given path group, influence or selection factors for selecting load balancing algorithms for a given path group, etc.

For example, the average loading may be computed or determined across some or all the paths in the group. A specific load balancing algorithm can be selected from the available load balancing algorithms, for example, based on comparison of the average loading with one or more configured average loading thresholds. Additionally, optionally or alternately, in some operational scenarios, loadings of some or all members of the group can be added up to form an aggregated load. In these operational scenarios, a specific load balancing algorithm can be selected from the available load balancing algorithms based on comparison of the aggregated loading with one or more configured aggregated loading thresholds. As used herein, load or loading on a specific path may represent either an instantaneous load or a weighted moving average of the instantaneous loads. By way of illustration but not limitation, in response to determining, based in part or in whole on path group attributes of a path group (identified for forwarding a received packet) indicating a first aggregated load of the path group such as a relatively high aggregated load of a path group, the load balancing algorithm controller 306 may generate one or more first load balancing algorithm controls to select or enable a first load balancing algorithm (one of 308 of FIG. 3A) that can best perform path selection for the path group in the first aggregated load as compared with other load balancing algorithms. A first member in the path group or a first network path such as a less used network path may be selected by the first load balancing algorithm for forwarding the received packet.

On the other hand, in response to determining, based in part or in whole on path group attributes of a path group (identified for forwarding a received packet) indicating a second aggregated load of the path group such as a relatively low aggregated load of a path group, the load balancing algorithm controller 306 may generate one or more second load balancing algorithm controls to select or enable a second load balancing algorithm (one of 308 of FIG. 3A) that can best perform path selection for the path group in the second aggregated load as compared with other load balancing algorithms. A second member in the path group or a second network path such as a relatively fast network path may be selected by the second load balancing algorithm for forwarding the received packet.

Additionally, optionally or alternatively, in some operational scenarios, different algorithms may be enabled or selected by the framework 300 in response to determining different overall load distributions across some or all members (or network paths) of a path group. Different load balancing or path selection algorithm may be used for relatively balanced and imbalanced overall load distributions, respectively.

3.6. Example Operational Modes

Figure 3B:
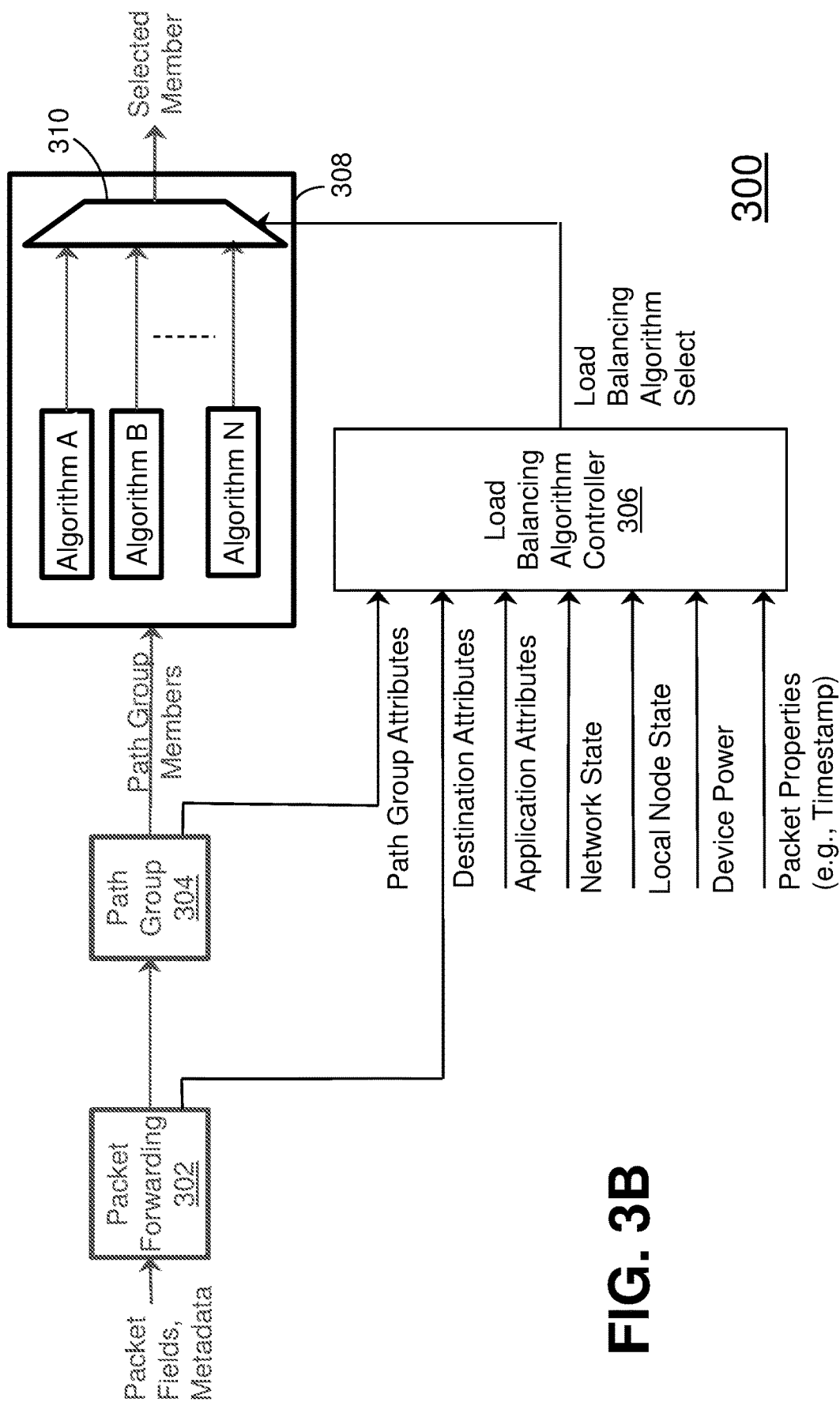
Figure 3C:
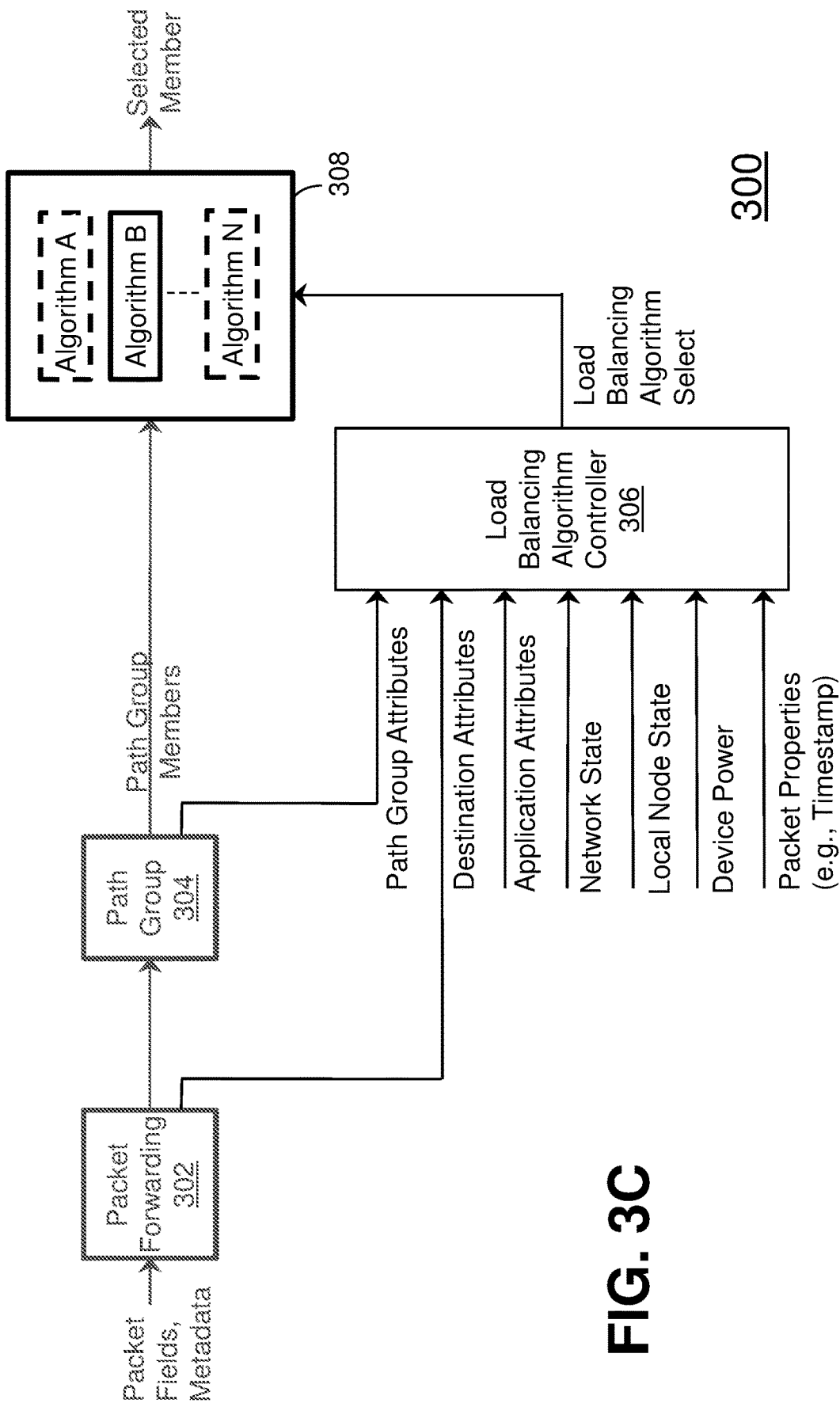
Figure 3D:
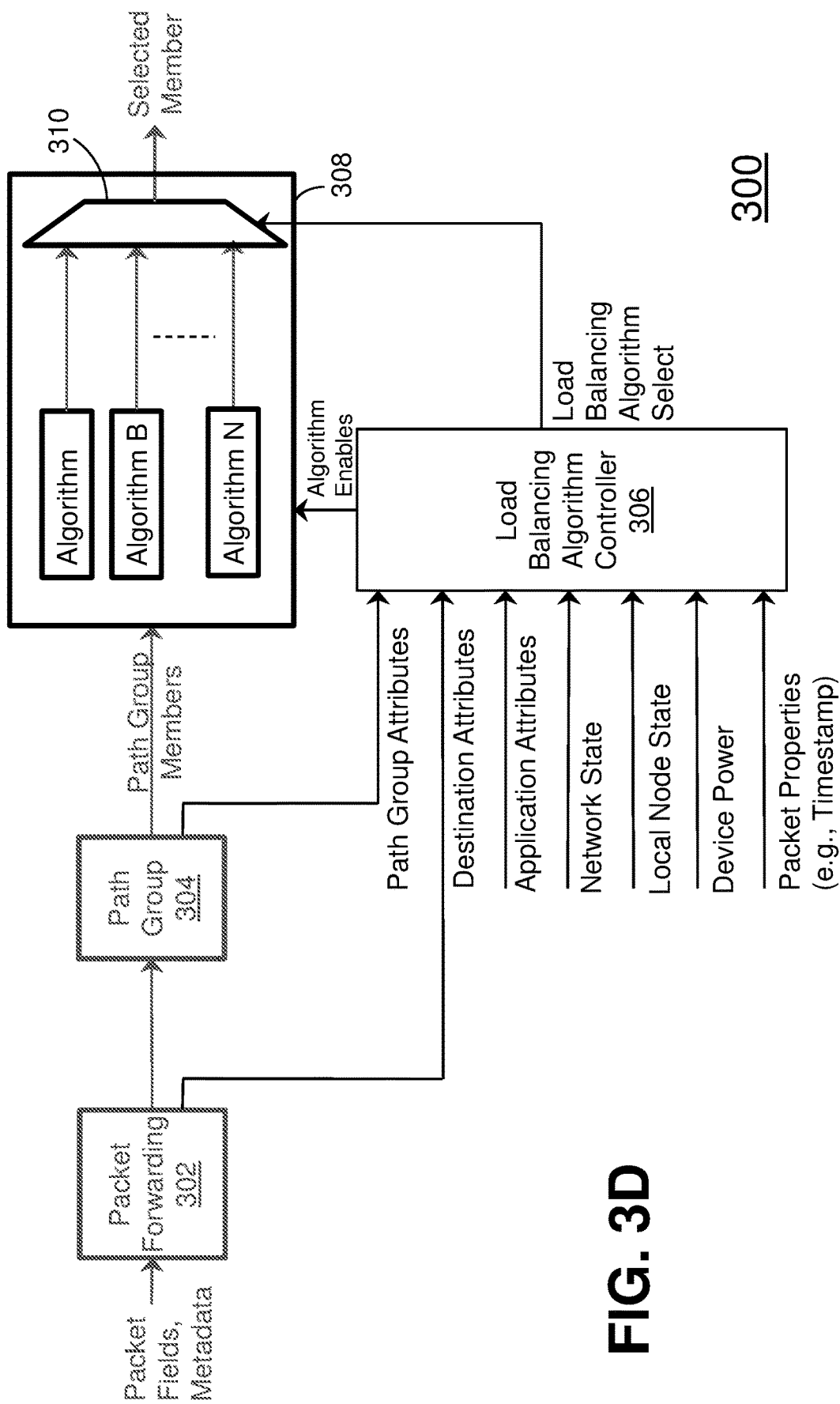

FIG. 3B through FIG. 3D illustrate example operational modes for application and state aware load balancing across available or in-service members (or network paths) of a path group.

A path selection framework such as 300 of FIG. 3A may operate in a first operational mode as illustrated in FIG. 3B to select a specific algorithm among a plurality of load balancing or path selection algorithms 308. The specific load balancing or path selection algorithm 308 searches relatively exhaustively for a lowest latency member or network path across a maximum number of available members or network paths in the path group may be selected or enabled. Hence, the specific algorithm may be used to select a specific member (or network path) in a path group that can forward a received packet to its destination with a relatively low (e.g., the lowest, etc.) latency.

In the first operational mode, some or all of the plurality of load balancing or path selection algorithms 308 may run in parallel or concurrently while a load balancing algorithm controller 306 determines which of the load balancing or path selection algorithms 308 may be selected or enabled. An algorithm selector 310 may be implemented or controlled to select the output of the specific load balancing or path selection algorithm 308 in response to receiving a specific load balancing (or path selection) algorithm select in algorithm controls sent or provided by the load balancing algorithm controller 306.

The framework 300 may operate in a second operational mode as illustrated in FIG. 3C to select or enable only a specific load balancing or path selection algorithm (e.g., Algorithm B in present example, etc.) in a plurality of load balancing or path selection algorithms 308 to run. The specific algorithm may use a relatively low power consumption to select a specific member (or network path) in a path group.

In the second operational mode, only the specific load balancing or path selection algorithm in the plurality of load balancing or path selection algorithms 308 may run in response to receiving a specific load balancing (or path selection) algorithm select in algorithm controls sent or provided by the load balancing algorithm controller 306. The specific load balancing (or path selection) algorithm select corresponds to the specific load balancing or path selection algorithm. All other load balancing algorithms other than the specific load balancing algorithm may be disabled from being run for the purpose of reducing power consumption.

The framework 300 may operate in a third (hybrid) operational mode as illustrated in FIG. 3D to first select a specific subset of algorithms in a plurality of load balancing or path selection algorithms 308 to run. The specific subset of algorithms may run in response to receiving one or more specific load balancing (or path selection) algorithm enables in algorithm controls sent or provided by the load balancing algorithm controller 306. All other load balancing algorithms other than the specific subset of load balancing algorithms may be disabled from being run for the purpose of reducing power consumption. The selection of the specific subset of algorithm may be dynamically adapt to realtime conditions such as realtime device or network operational statuses or states. For example, a subset of relatively low power consuming algorithms may be selection in response to determining that the network device or switching device is running at a relatively high power consumption or that the network device or switching device is operating at a relatively high temperature.

In the third operational mode, algorithms specified or identified in the specific subset of load balancing or path selection algorithms 308 may run in parallel or concurrently while the load balancing algorithm controller 306 continues to determine or search for a specific load balancing or path selection algorithm in the specific subset of load balancing or path selection algorithms may be selected to provide a specific member (or network path) in the path group with a relatively low latency. An algorithm selector 310 may be implemented or controlled to select the specific load balancing or path selection algorithm in response to receiving a specific load balancing (or path selection) algorithm select in algorithm controls sent or provided by the load balancing algorithm controller 306.

3.7. Deployment Examples

For the purpose of illustrations, a plurality of load balancing (or path/member selection) algorithms such as 308 of FIG. 3A may be supported in a network node or switching device that implements a path group load balancing framework 300. These algorithms 308 may include a dynamic load balancing algorithm that monitor or use lapsed time between successive packets, real time path or port loading/utilization and/or other port- or path-specific operational statuses to optimize traffic or packet distributions across members of a given path group determined for a received packet or a packet flow including the received packet. The dynamic algorithm may be implemented to maintain packet ordering within the traffic flow.

The algorithms 308 may also include a static hash based algorithm to distribute traffics among different members of the path group. For example, packet attributes such as source and destination addresses, source and destination ports, or a protocol (e.g., 5 tuple, etc.) may be determined from packet fields of the received packet. A hash value may be computed or generated based on these attributes using a hash function. The hash value—e.g., modulo the total number of available members in the path group, etc.—may be used to identify a specific member (or network path) in the path group for the received packet. Hence, for all packets in a packet or traffic flow—including the received packet—that share these attributes, a relatively static member (or network path) in the path group may be assigned to forward these packets. The static hash based algorithm maintains packet ordering within each traffic or packet flow and consumes a relatively low power, but may generate a suboptimal or non-optimized load distribution across the members of the path group as traffic or packet flows may not correspond to hash values that can be used to distribute packets in a relatively even distribution across the members (or network paths) of the path group.

The algorithms 308 may further include a random spraying algorithm to distribute traffics among different members of the path group. For example, the algorithm may randomly or pseudo-randomly distribute received packets across different members (or network paths) of a path group based on random or pseudo-random numbers generated (e.g., using the reception time of the very first packet as a seed value for a random number generator, etc.) for these packets. This method or algorithm does not maintain or ensure packet ordering with a specific traffic flow but generates a relatively even distribution of the packets across the members of the path group and consumes a relatively low (e.g., extremely, even lower than the hash based algorithm, etc.) power.

For the purpose of illustration only, the network node receives, processes and/or forwards packets originating from two computing or network applications. The first application, referred to as Application X, may be a TCP application or an application using TCP protocols for communication between endpoint devices that originate or receive TCP segments or packets encapsulating the TCP segments. The second application, referred to as Application Y, may be a UDP application or an application using UDP protocols for communication between endpoint devices that originate or receive UDP data encapsulated in packets.

Application X typically has elephant flows that generates relatively large numbers of successive packets in relatively long lives or time durations. Reordering of packets separated by relatively small time intervals by an intermediate network or any network node therein may cause a relatively large number of retransmissions, for example resulting in a 50% drop in throughput for this application. In comparison, Application Y typically has short lived flows. Reordering of packets for this application causes a relatively small number of packet drops or losses, for example resulting in a 10% drop in throughput.

A path selection framework such as 300 of FIG. 3A, or a load balancing algorithm controller 306 therein, may be configured to map packets received by a network node (e.g., a switching device, 200 of FIG. 2, etc.) to different load balancing algorithms, depending on the applications and states of the network node and/or the network.

For example, when power consumption of the network node is relatively low, Application X and Application Y may be both configured or controlled to use the dynamic algorithm for member/path selection.

However, when the power consumption is running high (e.g., above a power consumption threshold, etc.), the dynamic algorithm may be turned off for both Applications A and B, for example using specific algorithm enables (or algorithm enable signals) as illustrated in FIG. 3D.

Furthermore, packets relating to Application X may be mapped to the static hash algorithm to reduce power consumption while avoiding significant penalties or reductions for TCP communication throughput. Packets relating to Application Y may be mapped to random spraying to further reduce power consumption at a relatively penalty or reduction to UDP communication throughput.

This specific assignment or mapping of applications to different algorithms reduces overall device power consumption at the cost of a small reduction in throughput for Application Y and slightly less optimal load balancing for Application X.

4.0. EXAMPLE EMBODIMENTS

Figure 4:
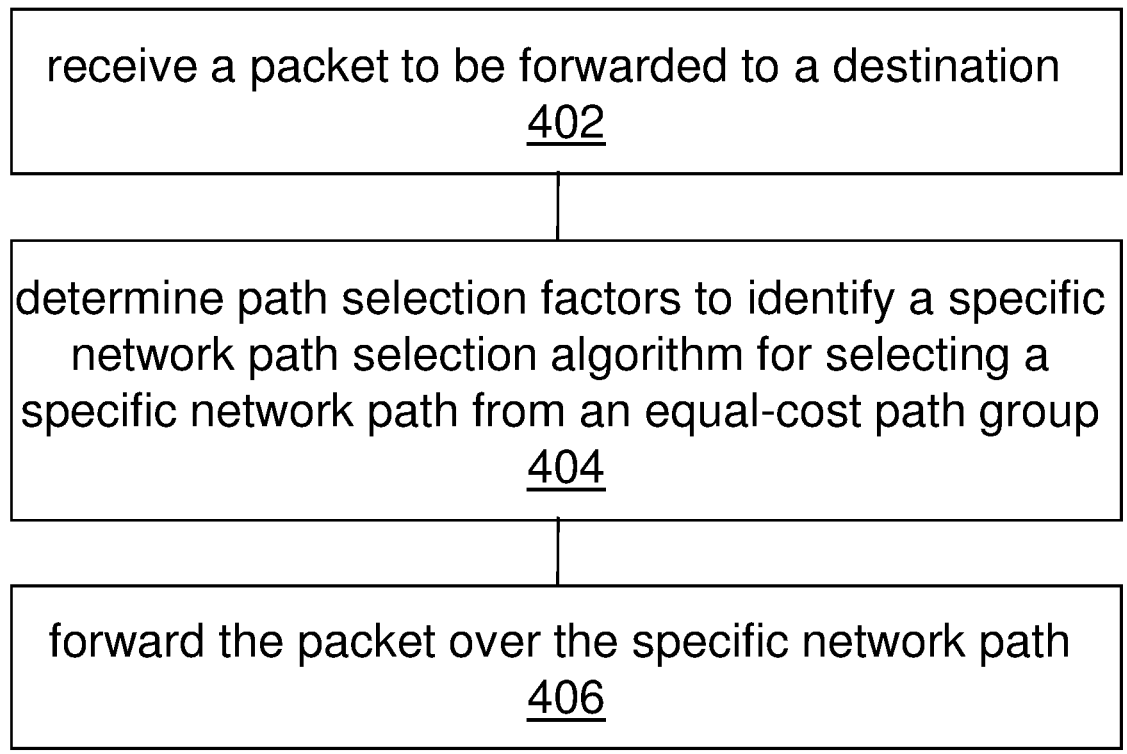
FIG. 4 illustrates an example microburst monitoring framework.

FIG. 4 illustrates an example process flow, according to an embodiment. The various elements of the flow described below may be performed by one or more network devices implemented with one or more computing devices. In block 402, a system (e.g., a switching device, a network node, etc.) as described herein receives a packet to be forwarded over a computer network to a destination. A group of multiple network paths is available to forward to the packet to the destination.

In block 404, the system determines one or more path selection factors to be used to identify a specific network load balancing algorithm to select a specific network path from the group of multiple network paths. The one or more path selection factors include at least one path selection factor determined based at least in part on a dynamic state of the computer network or a network node in the computer network.

In block 406, in response to selecting, by the specific network load balancing algorithm, the specific network path from among the group of multiple network paths, the system forwards the packet over the specific network path.

In an embodiment, the group of multiple network paths represents one of: a differentiated cost multi-path group, a differentiated weighted multi-path group, an equal-cost multi-path routing (ECMP) group, a link aggregation group (LAG), or a flow based multi-path group.

In an embodiment, the path selection factor is derived from one or more local operational states of a network device performing a method as described herein.

In an embodiment, the one or more local operational states of the network device include a device power state of the network device.

In an embodiment, the one or more path selection factors include a second path selection factor derived at least in part from one or more packet fields carried in the packet.

In an embodiment, the second path selection factor represents one of: a group attribute of the group of multiple paths; a destination attribute; an application attribute of an application originating the packet; etc.

In an embodiment, the second path selection factor is the application attribute of the application originating the packet; the second path selection factor indicates whether the application is sensitive to packet re-ordering.

In an embodiment, the method is performed by a first network device; the one or more path selection factors include a second path selection factor derived from network status data received by the first network device from one or more second network devices.

In an embodiment, the specific load balancing algorithm is selected from among a plurality of load balancing algorithms based at least in part on the one or more path selection factors.

In an embodiment, a computing device such as a switch, a router, a line card in a chassis, a network device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

5.0. IMPLEMENTATION MECHANISM-HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 5:
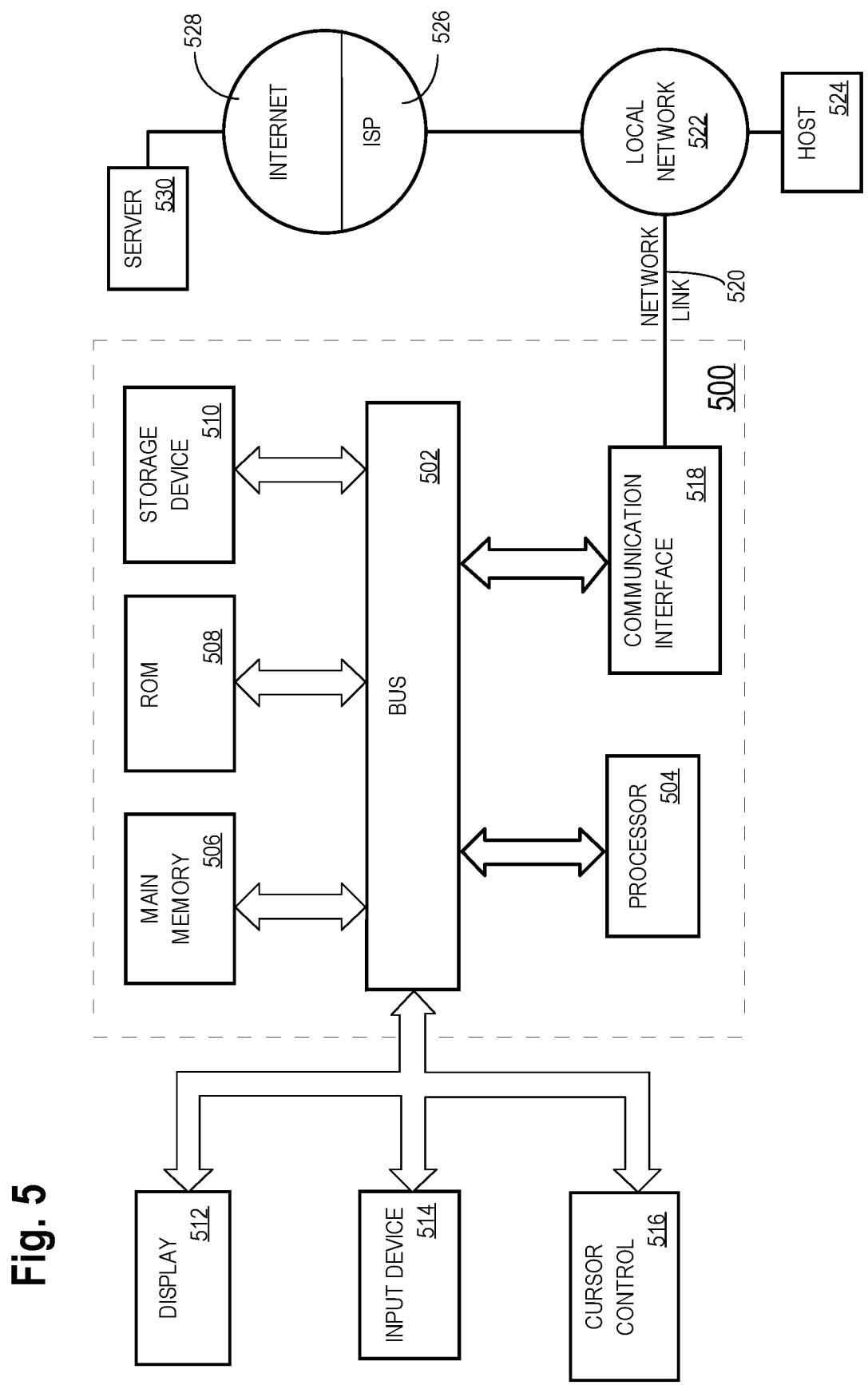
FIG. 5 is block diagram of an example computer system upon which embodiments of the inventive subject matter may be implemented.

FIG. 5 is a block diagram that illustrates an example computer system 1300 that may be utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device. In an embodiment, FIG. 5 constitutes a different view of the devices and systems described in previous sections.

Computer system 500 may include one or more ASICs, FPGAs, or other specialized circuitry 503 for implementing program logic as described herein. For example, circuitry 503 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 500 may include one or more hardware processors 504 configured to execute software-based instructions. Computer system 500 may also include one or more busses 502 or other communication mechanism for communicating information. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes one or more memories 506, such as a RAM, hardware registers, or other dynamic or volatile storage device for storing data units to be processed by the one or more ASICs, FPGAs, or other specialized circuitry 503. Memory 506 may also or instead be used for storing information and instructions to be executed by processor 504. Memory 506 may be directly connected or embedded within circuitry 503 or a processor 504. Or, memory 506 may be coupled to and accessed via bus 502. Memory 506 also may be used for storing temporary variables, data units describing rules or policies, or other intermediate information during execution of program logic or instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, may optionally be provided and coupled to bus 502 for storing information and instructions.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as an 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send and receive data units through the network(s), network link 520, and communication interface 518. In some embodiments, this data may be data units that the computer system 500 has been asked to process and, if necessary, redirect to other computer systems via a suitable network link 520. In other embodiments, this data may be instructions for implementing various processes related to the described techniques. For instance, in the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

Computer system 500 may optionally be coupled via bus 502 to one or more displays 512 for presenting information to a computer user. For instance, computer system 500 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

One or more input devices 514 are optionally coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

As discussed, computer system 500 may implement techniques described herein using customized hard-wired logic, one or more ASICs or FPGAs 503, firmware and/or program logic, which in combination with the computer system causes or programs computer system 500 to be a special-purpose machine. According to one embodiment, however, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a packet to be forwarded over a computer network to a destination, wherein a group of multiple network paths is available to forward to the packet to the destination;
   determining one or more path selection factors to be used to identify a specific network load balancing algorithm to select a specific network path from the group of multiple network paths, wherein the one or more path selection factors include at least one path selection factor determined based at least in part on a dynamic state of the computer network or a network node in the computer network;
   in response to selecting, by the specific network load balancing algorithm, the specific network path from among the group of multiple network paths, forwarding the packet over the specific network path.

2. The method of claim 1, wherein the group of multiple network paths represents one of: a differentiated cost multi-path group, a differentiated weighted multi-path group, an equal-cost multi-path routing (ECMP) group, a link aggregation group (LAG), or a flow based multi-path group.

3. The method of claim 1, wherein a path selection factor of the one or more path selection factors is derived from one or more local operational states of a network device performing the method as recited in claim 1.

4. The method of claim 3, wherein the one or more local operational states of the network device include a device power state of the network device.

5. The method of claim 1, wherein the one or more path selection factors include a second path selection factor derived at least in part from one or more packet fields carried in the packet.

6. The method of claim 5, wherein the second path selection factor represents one of: a group attribute of the group of multiple paths; a destination attribute; or an application attribute of an application originating the packet.

7. The method of claim 6, wherein the second path selection factor is the application attribute of the application originating the packet; wherein the second path selection factor indicates whether the application is sensitive to packet re-ordering.

8. The method of claim 1, wherein the method is performed by a first network device; wherein the one or more path selection factors include a second path selection factor derived from network status data received by the first network device from one or more second network devices.

9. The method of claim 1, wherein the specific network load balancing algorithm is selected from among a plurality of load balancing algorithms based at least in part on the one or more path selection factors.

10. A system comprising:
    one or more computing devices; and
    one or more non-transitory computer readable media storing instructions that, when executed by the one or more computing devices, cause performance of:
    receiving a packet to be forwarded over a computer network to a destination, wherein a group of multiple network paths is available to forward to the packet to the destination;
    determining one or more path selection factors to be used to identify a specific network load balancing algorithm to select a specific network path from the group of multiple network paths, wherein the one or more path selection factors include at least one path selection factor determined based at least in part on a dynamic state of the computer network or a network node in the computer network;
    in response to selecting, by the specific network load balancing algorithm, the specific network path from among the group of multiple network paths, forwarding the packet over the specific network path.

11. The system of claim 10, wherein the group of multiple network paths represents one of: a differentiated cost multi-path group, a differentiated weighted multi-path group, an equal-cost multi-path routing (ECMP) group, a link aggregation group (LAG), or a flow based multi-path group.

12. The system of claim 10, wherein a path selection factor of the one or more path selection factors is derived from one or more local operational states of a network device performing the method as recited in claim 1.

13. The system of claim 12, wherein the one or more local operational states of the network device include a device power state of the network device.

14. The system of claim 10, wherein the one or more path selection factors include a second path selection factor derived at least in part from one or more packet fields carried in the packet.

15. The system of claim 14, wherein the second path selection factor represents one of: a group attribute of the group of multiple paths; a destination attribute; or an application attribute of an application originating the packet.

16. The system of claim 15, wherein the second path selection factor is the application attribute of the application originating the packet; wherein the second path selection factor indicates whether the application is sensitive to packet re-ordering.

17. The system of claim 10, wherein the method is performed by a first network device; wherein the one or more path selection factors include a second path selection factor derived from network status data received by the first network device from one or more second network devices.

18. The system of claim 10, wherein the specific load balancing algorithm is selected from among a plurality of load balancing algorithms based at least in part on the one or more path selection factors.

19. One or more non-transitory computer readable media storing instructions that, when executed by one or more computing devices, cause performance of:
   receiving a packet to be forwarded over a computer network to a destination, wherein a group of multiple network paths is available to forward to the packet to the destination;
   determining one or more path selection factors to be used to identify a specific network load balancing algorithm to select a specific network path from the group of multiple network paths, wherein the one or more path selection factors include at least one path selection factor determined based at least in part on a dynamic state of the computer network or a network node in the computer network;
   in response to selecting, by the specific network load balancing algorithm, the specific network path from among the group of multiple network paths, forwarding the packet over the specific network path.

20. The one or more non-transitory computer readable media of claim 19, wherein the group of multiple network paths represents one of: a differentiated cost multi-path group, a differentiated weighted multi-path group, an equal-cost multi-path routing (ECMP) group, a link aggregation group (LAG), or a flow based multi-path group.

* * * * *